United States Patent
Bellander

(10) Patent No.: US 6,783,243 B2
(45) Date of Patent: Aug. 31, 2004

(54) OVERHEAD PROJECTOR

(76) Inventor: Wanja Bellander, Herrviksnaäs, S-139 40, Värmdö (SE)

(*) Notice: Subject to any disclaimer, the term of this patent is extended or adjusted under 35 U.S.C. 154(b) by 140 days.

(21) Appl. No.: 10/240,807
(22) PCT Filed: Mar. 30, 2001
(86) PCT No.: PCT/SE01/00653
§ 371 (c)(1), (2), (4) Date: Oct. 4, 2002
(87) PCT Pub. No.: WO01/75520
PCT Pub. Date: Oct. 11, 2001

(65) Prior Publication Data
US 2003/0048426 A1 Mar. 13, 2003

(30) Foreign Application Priority Data
Apr. 5, 2000 (SE) .............................. 0001281

(51) Int. Cl.[7] .................. G03B 21/14; G03B 21/28; G02F 1/1335
(52) U.S. Cl. ................... 353/20; 349/6; 353/98
(58) Field of Search ............... 349/6; 353/20, 353/98; 359/483, 237

(56) References Cited
U.S. PATENT DOCUMENTS

| 4,652,101 A | * | 3/1987 | Grunwald ............ 353/122 |
| 4,818,074 A | * | 4/1989 | Yokoi et al. ............ 349/6 |
| 5,206,673 A | * | 4/1993 | Kawahara et al. ....... 353/98 |
| 5,260,730 A | * | 11/1993 | Williams et al. ........ 353/122 |
| 5,333,072 A | * | 7/1994 | Willett ................ 349/6 |
| 5,889,614 A | * | 3/1999 | Cobben et al. ......... 359/483 |

FOREIGN PATENT DOCUMENTS

JP 4-174828 A1 6/1992

OTHER PUBLICATIONS

Brochure entitled D.Light för effektiva presentationer, Binnova AB, www.binnova.se.

* cited by examiner

Primary Examiner—Russell Adams
Assistant Examiner—Michael Dalakis
(74) Attorney, Agent, or Firm—Frishauf, Holtz, Goodman & Chick, P.C.

(57) ABSTRACT

An overhead projector is provided which eliminates disturbing light on a projection screen (12) from parts of a picture plate (2) of the projector which surround a projected document (10) as well as light on the screen (12) which arises when documents are being changed on the picture plate (2). The picture plate (2) is covered with a first polarizing layer (3) which is a supporting surface for the document, by placing a second polarizing layer (9) in the path of the light close to a projector head (6, 7) and by arranging the polarization directions of the first and second polarizing layers (3, 9) perpendicular to each other so that light which first passes the first polarizing layer (3) where no document is placed and thereafter passes the second polarizing layer (9) is absorbed.

12 Claims, 2 Drawing Sheets

OVERHEAD PROJECTOR

This application is a U.S. National Phase Application under 35 USC 371 of International Application No. PCT/SE01/00653 filed Mar. 30, 2001 (Published in English).

FIELD OF THE INVENTION

The present invention relates to an overhead projector comprising a transparent picture plate illuminated from below on which a transparent document with more or less opaque information can be supported and an optics arm which supports a projector head with optics and an oblique mirror to deflect a light beam from the picture plate towards a projection screen and to project information onto it.

BACKGROUND OF THE INVENTION

When no document has been placed on the picture plate of an overhead projector, the whole surface of the picture plate is projected as a large, strongly illuminated square on the projection screen. As soon as a document is placed on the picture plate, the illumination is reduced, partly because the document itself absorbs some light and partly because the information in the form of text, pictures and/or diagrams absorbs light. Of the original illumination, there remains a square frame around the document and out to the edges of the picture plate, since the documents used are normally smaller than the picture plate. Both the light variations between successive projections and the strongly illuminated frame surrounding a projected picture disturb the audience.

In order to remedy these inconveniences to some extent, opaque rulers can be placed on the picture plate around the document. These are not used very often, since it is tiresome to have to check that the rulers are placed correctly after each change of picture.

Another method is to encapsulate each document between two light-polarizing plastic films with a size that is at least equal to the surface of the picture plate, the polarization directions being arranged so that they are at an angle of 90° to each other. Such an arrangement means that the light, after being polarized by the film, becomes depolarized after passing the document and can thereby pass the second film without being absorbed.

In the regions around the document, however, the light must pass through two polarizing filters with polarization directions at an angle of 90° to each other and they consequently absorb the light almost completely. No strongly illuminated frame around the projected picture is therefore created. Polarizing film is unfortunately very expensive, and this solution is therefore seldom used. Another very important disadvantage in practice is that the document with its initial information is not accessible during the display for complementary information to be drawn directly onto the document.

To be able to draw on the document is often desirable in order to clarify a process, and the document is then discarded and replaced with a new document with the initial information in a subsequent display. It would be unsuitable to draw on the upper side of the film since this would damage the film and the slightest displacement between film and document would make the information difficult to interpret. It would also be necessary to discard at least the upper polarizing film or both the document and both films, if these are sealed around the edges, after each display.

SUMMARY OF THE INVENTION

The object of the present invention is to provide a solution to the above described problems, not only so that the strongly illuminated frame around the projected picture is eliminated but also so that the illumination on the projection screen is automatically strongly reduced when the pictures are being changed. It shall also be possible to draw on the document during the display.

According to the invention, this is made possible by equipping the projector with two polarizing layers positioned essentially perpendicular to the light beam fitted at a distance from each other. Namely, a first polarizing layer covers the picture plate and is a supporting surface for the document, and a second polarizing layer is fixed in a holder in the path of the light beam close to the projector head, such that the polarization directions of the polarizing layers are arranged to be perpendicular to each other, so that if there is no document on the supporting surface the projection screen is not illuminated, whereas if there is a document on the picture plate, the transmission of light from those parts of the picture plate which are located between the edges of the document and the edges of the picture plate is counteracted by the polarizing layers and only the document is shown illuminated on the projection screen. The layers are suitably arranged on a glass plate to resist the influence of heat but can also be arranged on a heat-resistant film of a plastic material.

BRIEF DESCRIPTION OF THE DRAWINGS

The appended drawings show schematically three different designs for the invention as examples.

DETAILED DESCRIPTION

Figure 1:
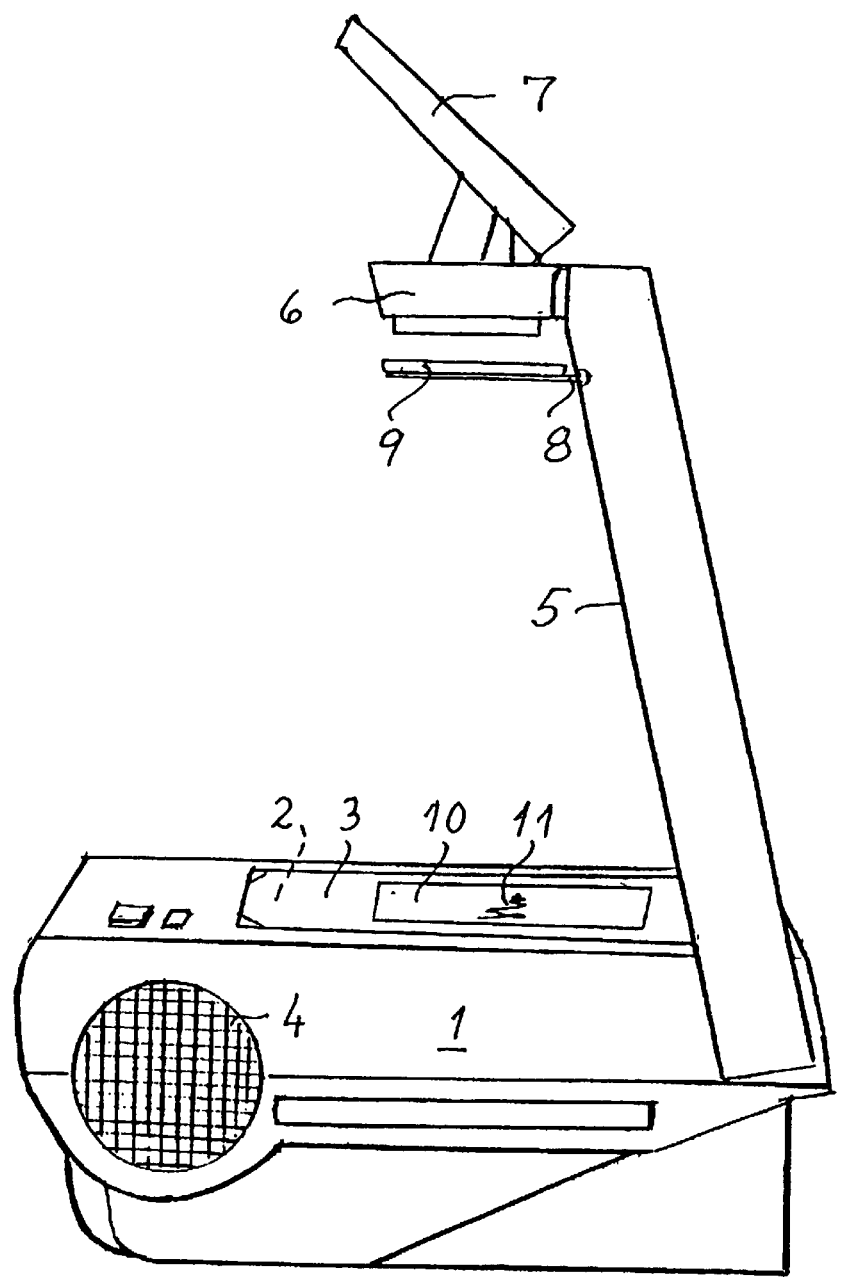
FIG. 1 is a perspective drawing of a preferred design for an overhead projector according to the invention.

The overhead projector shown in the drawings, the "OH-projector", is a projector that is illuminated from below, but the following description is essentially valid also for projectors which are illuminated from above.

The OH-projector comprises a housing 1 containing a lamp with a reflector for illumination from below of a square picture plate 2 which is covered with a polarizing layer 3. The heat generated by the lamp is partly ventilated away by a strong fan with an outlet 4. A hinged arm 5 has been fitted onto the housing. At the free end of the arm, an optical device 6 is fixed and a mirror 7 is adjustably fitted. A holder 8 for a polarizing layer 9 is further fitted so that it is adjustable from the position shown to a position close to the optical device 6. The latter position is used when the arm 5 is folded down for transport of the projector.

Figure 2:
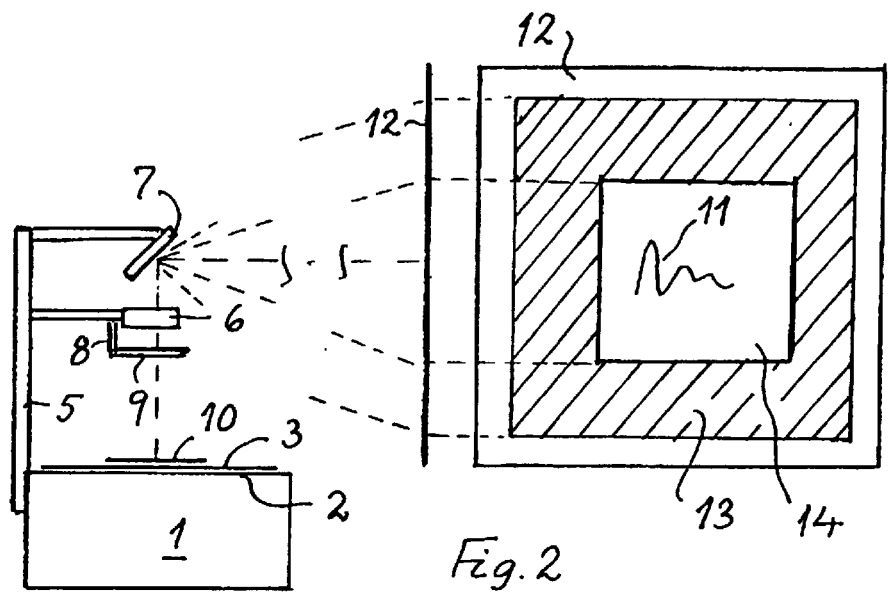
FIG. 2 is a side view of the projector in FIG. 1 and a projection screen which is also shown from the front.

The optical device 6, the layer 9 and the mirror 7 are adjusted relative to each other and the picture plate 2 so that a transparent document 10 with information 11 placed on the layer 3 is projected on a screen 12 as shown in FIG. 2.

If no document is placed on the polarizing layer 3 on the picture plate 2, a light beam from the picture plate 2 will have a certain polarization direction when it strikes the polarizing layer 9, which has a polarization direction perpendicular to the polarization direction of the layer 3. Only a very small part of the light beam will therefore be able to pass the layer 9 and it will be projected as a dark square 13 on the screen 12.

If a document 10 is placed on the layer 3, the light which passes document 10 is depolarized, and this depolarized light can pass through the layer 9 and be projected onto the screen 12 as a light reproduction 14 of the document 10 with the information 11.

When the document 10 is removed to one side from the layer 3 on the picture plate 2, this is reflected on the screen 12 by the fact that the reproduction successively disappears and leaves a curtain after it with the same degree of darkness as in the square 13.

In certain cases, the document 10 must be turned slightly on the layer 3 for optimal transmission of light through the polarizing layers 3 and 9. To prevent the picture of the document on the screen 12 from being shown at an oblique angle, it is appropriate that the layers 3 and 9 are instead arranged on the picture plate 2 and in the holder 8 so that they can be adjusted.

Figure 3:
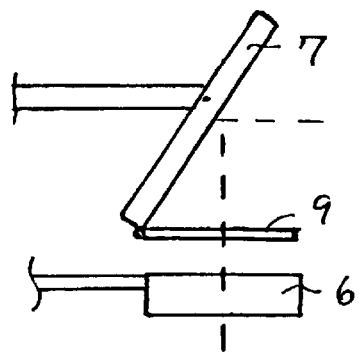
FIG. 3 is a part view of a projector head with the second polarizing filter placed before the mirror of the projector head.
Figure 4:
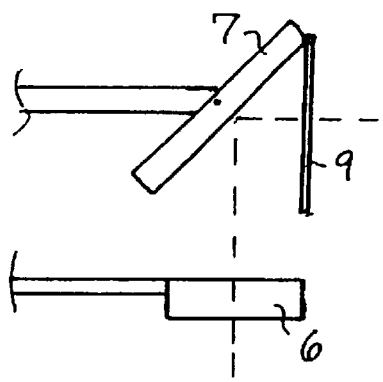
FIG. 4 is a part view similar to FIG. 3 but with the second polarizing layer placed perpendicular to the light beam leaving the mirror.

The layer 9 and its holder 8 can alternatively be placed as shown in FIG. 3 with the holder 8 adjustably fitted at the bottom edge of the mirror 7 so that the layer 9 during use is placed perpendicular to the light beam leaving the optical device 6, but is adjacent to the mirror surface when the arm 5 is folded down.

With the structure of the present invention, since the polarization of the light which has passed the first polarizing filter is cancelled when it passes through the document, it is only the light which passes both the polarizing layers in the space between the edge of the document and the edges of the picture plate which is almost completely extinguished, and this is evident on the projection screen in that only the document with the information is reproduced on the screen, with a dark surround. When the document is then lifted to the side and away from the picture plate, the two polarizing layers become continuously active so that the rear edge of the document is followed by a dark curtain on the projection screen, i.e. there is no illumination of the screen while a document is being removed from the picture plate, and this is restful to the eyes of the observers. There is of course no hindrance against drawing on the document during display.

The second polarizing layer can preferably be placed before the optics of the projector head. For this, a simple, fixed holder is required which is fitted onto the projector head or the arm. Alternatively, the second polarizing layer can be placed in the path of the light before the mirror of the projector head. It can also advantageously be placed perpendicular to the light beam in its path immediately after the mirror of the projector head, and it can be equipped with a revolving holder mounted onto the projector head to allow the customary folding together of the projector without damaging the layer or the holder.

When some types of overhead film are used for the document, it may be necessary to turn the document through a small angle relative to the polarizing films for optimal light transmission through the document. For this reason, according to one design of the invention, both the polarizing filters can be rotated in their planes, which can easily be done since the picture plate is normally square with rounded corners, to which the shape of the first polarizing layer can be adjusted.

The second layer, which has small dimensions, can be circular in shape and fitted so that it can be rotated in its holder.

The invention is not of course limited to the specific examples shown and described herein and several modifications are possible within the scope of the invention as defined by the appended claims. For example, an OH-projector with illumination from above can be used, the layer 9 with the holder 8 can be adjustably fitted onto the optics arm 5, and the layer 3 on the picture plate 2 can be covered with protective glass without deviating from the invention. In addition, the two polarizing layers need not be fixed onto the projector from the beginning but can be supplied as an accessory.

What is claimed is:

1. An overhead projector comprising:
   a transparent picture plate for supporting a transparent document having substantially opaque information provided thereon;
   a light source for illuminating the picture plate with a light beam;
   a projector head having an optical device and an oblique mirror to deflect the light beam illuminating the picture plate toward a projection screen so as to project the information provided on the document onto the screen;
   first and second polarizing layers positioned substantially perpendicular to the light beam and fitted at a distance from each other;
   wherein the first polarizing layer covers the picture plate and forms a supporting surface for the document, and the second polarizing layer is positioned in a path of the light beam close to the projector head; and
   wherein polarization directions of the first and second polarized layers are arranged to be perpendicular to each other, so that when no document is provided on the supporting surface the projection screen is not illuminated, whereas when the document is provided on the supporting surface transmission of light from parts of the picture plate located between edges of the document and edges of the picture plate is counteracted by the first and second polarizing layers and only the document is illuminated on the projection screen.

2. The overhead projector according to claim 1, wherein the light source illuminates the projector plate from below, and the projector head is held above the projector plate by an arm.

3. The overhead projector according to claim 2, wherein the second polarizing plate is held by a holder provided on the arm beneath the projector head.

4. The overhead projector according to claim 1, wherein the second polarizing layer is positioned before the optical device of the projector head.

5. The overhead projector according to claim 1, wherein the second polarizing layer is positioned in the path of the light beam before the mirror of the projector head.

6. The overhead projector according to claim 1, wherein the second polarizing layer is positioned perpendicular to the light beam in the path of the light beam immediately after the mirror of the projector head.

7. The overhead projector according to claim 1, wherein the first and second polarizing layers are planar, and the first and second polarizing layers are both adjustable in their planes.

8. The overhead projector according to claim 2, wherein the first and second polarizing layers are planar, and the first and second polarizing layers are both adjustable in their planes.

9. The overhead projector according to claim 3, wherein the first and second polarizing layers are planar, and the first and second polarizing layers are both adjustable in their planes.

10. The overhead projector according to claim 5, wherein the first and second polarizing layers are planar, and the first and second polarizing layers are both adjustable in their planes.

11. The overhead projector according to claim 6, wherein the first and second polarizing layers are planar, and the first and second polarizing layers are both adjustable in their planes.

12. The overhead projector according to claim 7, wherein the first and second polarizing layers are planar, and the first and second polarizing layers are both adjustable in their planes.

* * * * *